UNITED STATES PATENT OFFICE 2,286,037

PROCESS FOR THE PREPARATION OF SUBSTITUTED GLYCERIC ALDEHYDES

Donald J. Loder, Wilmington, Del., assignor to E. I. du Pont de Nemours & Company, Wilmington, Del., a corporation of Delaware No Drawing. Application April 13, 1939, Serial No. 267,614

10 Claims. (Cl. 260—602)

The present invention relates to a process for the preparation of substituted glyceric aldehydes and more particularly to the preparation of alpha substituted ethers of glyceric aldehyde by the interaction of oxy-substituted acetaldehydes with formaldehyde.

The products of the invention may be designated by the generic formula, $$CH_2OH.CHOR.CHO,$$

in which R designates an alkyl, aryl, alkoxy methylene or aryloxy methylene group. Specific examples of these compounds are: alpha methyl ether of glyceric aldehyde, $CH_2OH.CHOCH_3.CHO$; alpha ethyl ether of glyceric aldehyde, $$CH_2OH.CHOC_2H_5.CHO;$$

alpha propyl ether of glyceric aldehyde, $$CH_2OH.CHOC_3H_7.CHO;$$

alpha butyl and alpha isobutyl ethers of glyceric aldehyde, $CH_2OH.CHOC_4H_9.CHO$; alpha phenyl ether of glyceric aldehyde, $$CH_2OH.CHOC_6H_5.CHO;$$

alpha (methoxy methyl) ether of glyceric aldehyde, $CH_2OH.CHOCH_2OCH_3.CHO$; and alpha acetoxy ether of glyceric aldehyde, $$CH_2OH.CHOCOCH_3.CHO.$$

The products of the invention are prepared by interacting formaldehyde with oxy-substituted acetaldehydes, the above products being prepared, respectively, from methoxy acetaldehyde, $CH_3OCH_2CHO$; ethoxy acetaldehyde, $C_2H_5OCH_2CHO$; propoxy acetaldehyde, $$C_3H_7OCH_2CHO;$$

butoxy and isobutoxy acetaldehyde, $$C_4H_9OCH_2CHO,$$

phenoxy acetaldehyde, $C_6H_5OCH_2CHO$, methoxy methoxy acetaldehyde, $CH_3OCH_2OCH_2CHO$, and acetoxy acetaldehyde, $CH_3COOCH_2CHO$.

An object of the invention is to provide a process for the preparation of the above designated products and homologues thereof. Another object of the invention is to provide a process for the preparation of alpha alkyl ethers of glyceric aldehyde and alpha aryl ethers of glyceric aldehyde by the interaction of corresponding oxy-substituted aldehydes with formaldehyde. Another object of the invention is to provide pH conditions and catalysts under which the reaction goes spontaneously. Yet another object of the invention is to provide new compounds. Further objects and advantages of the invention will hereinafter appear.

The process of the invention may be effected by interacting an oxy-substituted acetaldehyde such as methoxy acetaldehyde with formaldehyde, the hydrogen ion concentration of the mixture of aldehydes being adjusted to a pH of greater than 7 and preferably between 8 and 10 by the addition of a base. The reaction goes spontaneously and the temperature ranges between 30–45° C. When large quantities of the aldehydes are reacted, cooling means should be provided in order that the temperature does not go appreciably above 45° C.

When the reaction has terminated, which can be determined by noting when the temperature of the reactants drop, the reaction product is subjected to fractional distillation for the recovery of the alpha alkyl ether of glyceric aldehyde.

The reaction may be conducted, if desired, in any suitable solvent such as water or an alcohol. Aqueous formaldehyde may likewise be employed such as formalin or, if desired, the polymeric forms of formaldehyde, paraformaldehyde, trioxymethylene and the like may be added directly to the oxy-substituted acetaldehyde, either dissolved in water or in another suitable solvent. The formaldehyde should be present in the ratio of 0.5 to 1 part per part of the substituted aldehyde reacted.

The pH value of the solution should be adjusted as has been indicated between a pH of from 7-10 and this may be effected by adding an aqueous or an alcoholic solution of a suitable base such as sodium or potassium hydroxide or carbonate. Catalysts may likewise be present and especially catalysts which provide an ion of an element of subgroup A. group II, and group IV in the periodic table and/or an enediol. By an enediol is meant a compound having the group $$\begin{matrix} -C=C- \\ | \quad | \\ OH \quad OH \end{matrix}$$

or a compound capable of enolizing, rearranging, or hydrolyzing to give products having such a grouping. Preferred catalysts are metallic lead and its oxide, hydroxide, nitrate, formate, etc., and like salts or oxides of tin, calcium, barium, magnesium and cerium. One to 10% of the enediols, if used, should preferably be added just prior to the addition of the catalysts. Suitable enediols include glucose, ascorbic acid, fructose, benzoin, glycolic aldehyde, invert sugar and the like.

The more detailed practice of the invention is illustrated by the following examples in which parts given are by weight unless otherwise stated. There are, of course, many forms of the invention other than these specific embodiments.

*Example 1.*—An aqueous solution of methoxy acetaldehyde containing 82% of the aldehyde and 18% water is mixed with 100 parts of formalin containing 40% formaldehyde. The pH value of the resulting solution is adjusted to between 8 and 9 by the addition of a 10% aqueous solution of sodium hydroxide. When the reaction, which starts spontaneously, has substantially ceased, the products thereof are subjected to fractional distillation and glyceric aldehyde alpha methyl ether is recovered in a yield of substantially 40%, based on the weight of methoxy acetaldehyde.

*Example 2.*—An aqueous solution of methoxy acetaldehyde containing 81% methoxy acetaldehyde and 19% water is mixed with an equimolal amount of formalin solution containing 37% formaldehyde. The pH value of the resulting solution is adjusted to 8.3 by addition of 10% aqueous solution of sodium hydroxide and the pH is maintained at 8.2–8.3 until the reaction is substantially complete. The temperature during the reaction is maintained by cooling, if necessary, at a maximum of 40–42° C. The reaction mixture is subjected to fractional distillation and glyceric aldehyde alpha-methyl ether, B. P. 66–68° at 1 mm., isolated in about 35% yield, based on the weight of methoxy acetaldehyde.

The process of the invention proceeds more satisfactorily and with less tendency to form side products if freshly distilled oxy-substituted acetaldehydes are used as starting material. Acetaldehydes polymerize spontaneously on standing to a dimer or higher polymeric form which forms of the aldehyde are not as desirable as starting material as the monomeric or depolymerized, freshly distilled aldehyde. Distillation of the polymeric aldehyde appears to depolymerize it to the monomeric form but upon standing it gradually is reconverted to the polymeric form. For this reason, it is of advantage to allow very little time to elapse between the distillation of the oxy-substituted acetaldehyde and its use.

From a consideration of the above specification, it will be realized that many changes may be made in the details therein given without departing from the scope of the invention or sacrificing any of the advantages that may be derived therefrom.

I claim:

1. A process for the preparation of an ether substituted glyceric aldehyde which comprises interacting in the liquid phase aqueous formaldehyde and a compound selected from the group consisting of alkoxy acetaldehydes and aryloxy acetaldehydes, the interaction being effected in a medium adjusted to a pH of greater than 7 and at a temperature below 45° C.

2. A process for the preparation of an ether substituted glyceric aldehyde which comprises effecting the interaction of formaldehyde and a compound selected from the group consisting of alkoxy acetaldehydes and aryloxy acetaldehydes in an aqueous medium in which the pH value is between 7 and 10 and at a temperature below 45° C.

3. A process for the preparation of alpha methyl ether of glyceric aldehyde which comprises interacting in the liquid phase aqueous formaldehyde with methoxy acetaldehyde in the presence of an alkaline catalyst.

4. A process for the preparation of alpha ethyl ether of glyceric aldehyde which comprises interacting in the liquid phase aqueous formaldehyde with an ethoxy acetaldehyde in the presence of an alkaline catalyst and at a temperature below 45° C.

5. A process for the preparation of alpha (methoxy methyl) ether of glyceric aldehyde ether which comprises interacting in the liquid phase aqueous formaldehyde with methoxy methoxy acetaldehyde.

6. A process for the preparation of alpha methyl ether of glyceric aldehyde which comprises interacting in the liquid phase aqueous formaldehyde with a freshly distilled methoxy acetaldehyde.

7. A process for the preparation of alpha methyl ether of glyceric aldehyde which comprises preparing an aqueous solution containing approximately 82 parts of methoxy acetaldehyde and approximately 13 parts of water, adding thereto approximately 35 parts of formaldehyde, and a 10% sodium hydroxide solution until the solution has a pH value of from 8 to 9 and after the reaction has substantially ceased recovering the alpha methyl ether of glyceric aldehyde from the reaction products by fractional distillation.

8. A process which comprises the preparation of an ether-substituted glyceric aldehyde by interacting in the liquid phase aqueous formaldehyde with a compound selected from the group consisting of alkoxy acetaldehydes and aryloxy acetaldehydes in contact with an alkaline catalyst.

9. A process which comprises the preparation of an alpha alkyl ether of glyceric aldehyde by interacting from 0.5 to 1.0 part by weight of formaldehyde per part by weight of an alkoxy acetaldehyde in the presence of water and an alkaline catalyst.

10. A process which comprises the preparation of an alpha aryl ether of glyceric aldehyde by interacting from 0.5 to 1.0 part by weight of formaldehyde per part by weight of an aryloxy acetaldehyde in the presence of water and an alkaline catalyst.

DONALD J. LODER.